United States Patent [19]

Utsumi

[11] Patent Number: 4,831,561

[45] Date of Patent: May 16, 1989

[54] WORK POSITION ERROR DETECTING APPARATUS

[75] Inventor: Noriyuki Utsumi, Yokohama, Japan

[73] Assignee: Tokico Ltd., Kanagawa, Japan

[21] Appl. No.: 64,201

[22] Filed: Jun. 18, 1987

[30] Foreign Application Priority Data

Jun. 19, 1986 [JP] Japan ................................ 61-143860
Aug. 19, 1986 [JP] Japan ................................ 61-193782

[51] Int. Cl.⁴ .................... G06F 15/46; G06F 15/20
[52] U.S. Cl. .................................. 364/560; 356/375;
356/386; 364/516; 364/559; 364/513
[58] Field of Search ............... 364/167, 469, 478, 516,
364/559, 550, 513, 560; 356/375, 376, 385, 386,
363; 901/7, 43, 46, 47; 250/201, 561

[56] References Cited

U.S. PATENT DOCUMENTS

| | | | |
|---|---|---|---|
| 4,254,433 | 3/1981 | Dewar et al. ........................ | 901/46 |
| 4,517,653 | 5/1985 | Tsuchihashi et al. ................ | 364/513 |
| 4,532,148 | 7/1985 | Vecellio .............................. | 901/43 |
| 4,553,217 | 11/1985 | Daudt et al. ....................... | 364/560 |
| 4,639,878 | 1/1987 | Day et al. .......................... | 364/513 |
| 4,670,974 | 6/1987 | Antoszewski et al. ............... | 901/7 |
| 4,672,562 | 6/1987 | Egli et al. .......................... | 364/516 |
| 4,714,044 | 12/1987 | Kikuchi et al. ..................... | 901/43 |
| 4,715,772 | 12/1987 | Kanayama .......................... | 364/513 |
| 4,721,630 | 1/1988 | Takeo et al. ........................ | 901/43 |

FOREIGN PATENT DOCUMENTS

| | | | |
|---|---|---|---|
| 0019596 | 11/1980 | European Pat. Off. ............. | 901/43 |
| 2850421 | 5/1980 | Fed. Rep. of Germany ........ | 901/43 |

*Primary Examiner*—Parshotam S. Lall
*Assistant Examiner*—Kevin J. Teska
*Attorney, Agent, or Firm*—Michael N. Meller

[57] ABSTRACT

A work position error detecting apparatus comprises at least three one dimensional sensors for generating outputs dependent on a detected position of a work, where the one dimensional sensors are arranged so that directions in which the position of the work is detected is mutually different among the one dimensional sensors, a memory device for pre-storing outputs of each of the one dimensional sensors at a reference position of the work, and a computing unit for calculating and outputting a position error quantity of the work from the reference position based on outputs of the one dimensional sensors and the outputs of the one dimensional sensors at the reference position pre-stored in the memory device.

15 Claims, 7 Drawing Sheets

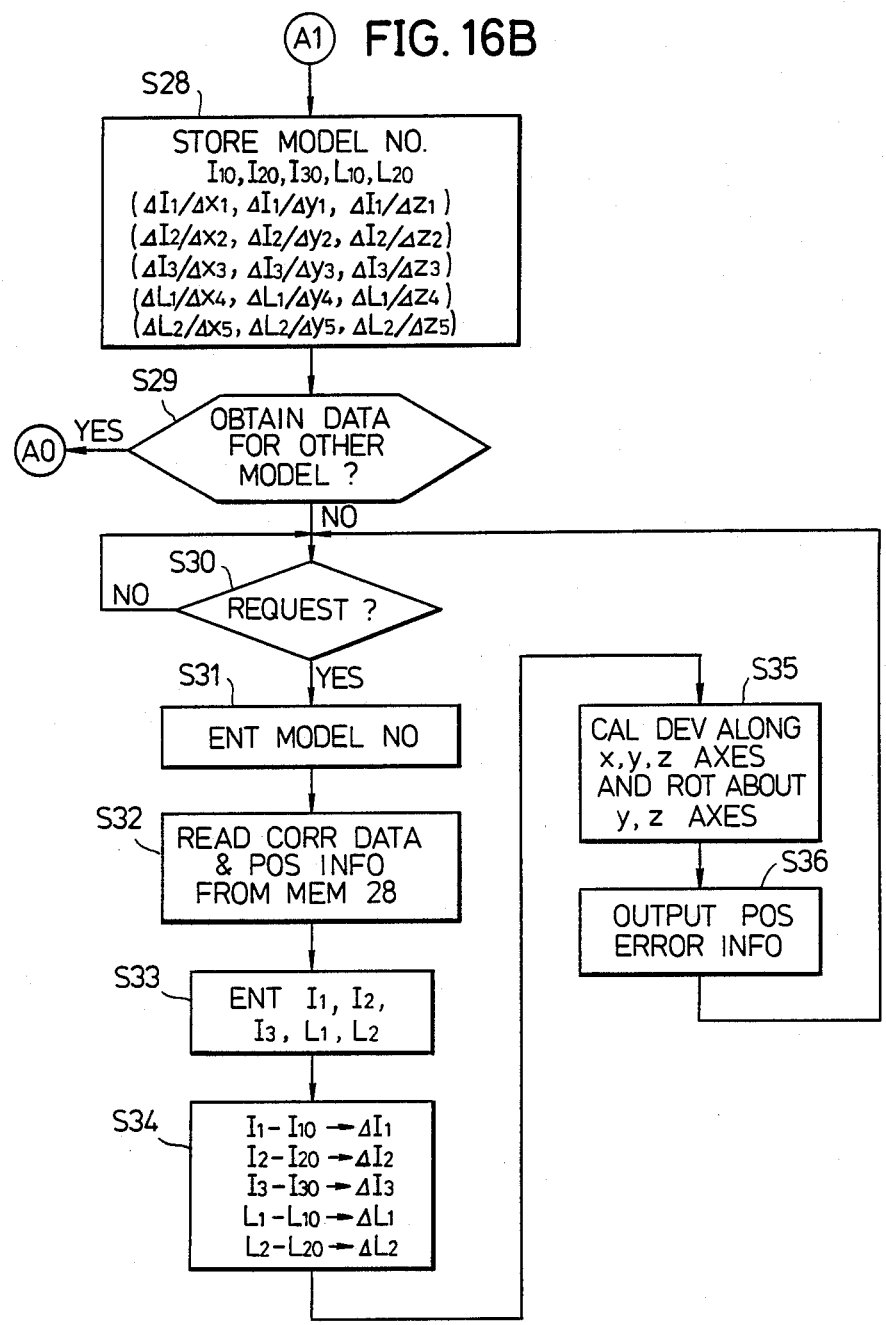

WORK POSITION ERROR DETECTING APPARATUS

BACKGROUND OF THE INVENTION

The present invention generally relates to work position error detecting apparatuses, and more particularly to a work position error detecting apparatus which is suited for use in a robot system such as a sealing robot system for sealing car bodies where there is a need to correct the position of a car body which is supplied as the work.

For example, in a painting robot system used in an automobile painting line, there is a need to detect the position of a car body which is supplied as the work, and feed back the detected position of the car body to a robot control part of the painting robot system so that the position of the car body can be corrected if the position of the car body is deviated from a reference position. In other words, a work position error detecting apparatus is required for detecting the deviation in the position of the work from the reference position.

As a previously proposed work position error detecting apparatus, there is a work position error detecting apparatus comprising four television cameras arranged below the automobile painting line. The car bodies on the automobile painting line respectively have four circular reference holes located at predetermined positions. The four reference holes may be holes which are originally provided in the car body for mounting certain parts or provided exclusively for the position detection. When the car body is positioned, the four television cameras pickup the corresponding reference holes which appear as oval holes in the picked up image because the television cameras respectively pick up the reference holes from an angle below the automobile painting line. The picked up image is processed so as to obtain data such as the center position, major axis, minor axis and inclination of each reference hole. The data is used to calculate the error in the position of the car body from the reference position in three dimensions, that is, the deviation along x, y and z axes and rotary deviation about the x, y and z axes which are often referred to as rolling, pitching and yawing.

However, the previously proposed work position error detecting apparatus has the following problems. Firstly, in order to process the picked up image, a computer which is used for control must process a large quantity of data. For this reason, it takes time to process the data, the response of the painting robot system is slow, and the production speed of the automobile painting line is slowed down thereby.

Secondly, when the television cameras are used to pickup the reference holes in the car body, the limit of the resolution is only in the order of 1% of the total field of vision. Hence, the accuracy with which the position error is detected is unsatisfactory, and it is impossible to position the work with a high positioning accuracy. But in a sealing robot system for sealing car bodies, for example, it is essential that the work (car body) is positioned with a high positioning accuracy.

SUMMARY OF THE INVENTION

Accordingly, it is a general object of the present invention to provide a novel and useful work position error detecting apparatus in which the problems described heretofore are eliminated.

Another and more specific object of the present invention is to provide a work position error detecting apparatus in which at least three one dimensional sensors having mutually different detecting directions are located at positions for detecting the work position along the respective detecting directions, and a position error (deviation) of the work from a reference position is calculated from outputs of the one dimensional sensors. According to the work position error detecting apparatus of the present invention, it is possible to improve the position detecting accuracy because the resolution of the one dimensional sensors is large compared to that of television cameras. In addition, it is possible to calculate the position error in various directions based on a relatively small quantity of data obtained from the outputs of the one dimensional sensors.

Still another object of the present invention is to provide a work position error detecting apparatus in which the one dimensional sensors are provided movable along the respective detecting directions. According to the work position error detecting apparatus of the present invention, it is possible to relatively move the work with respect to the one dimensional sensors by moving the one dimensional sensors, and it is possible to obtain correlation data from absolute values of moving quantities of the one dimensional sensors and the outputs of the one dimensional sensors.

Other objects and further features of the present invention will be apparent from the following detailed description when read in conjunction with the accompanying drawings.

BRIEF DESCRIPTION OF THE DRAWINGS

FIGS. 16A and 16B are flow charts for explaining the operation of a computing unit in the fourth embodiment.

DETAILED DESCRIPTION

Figure 1:
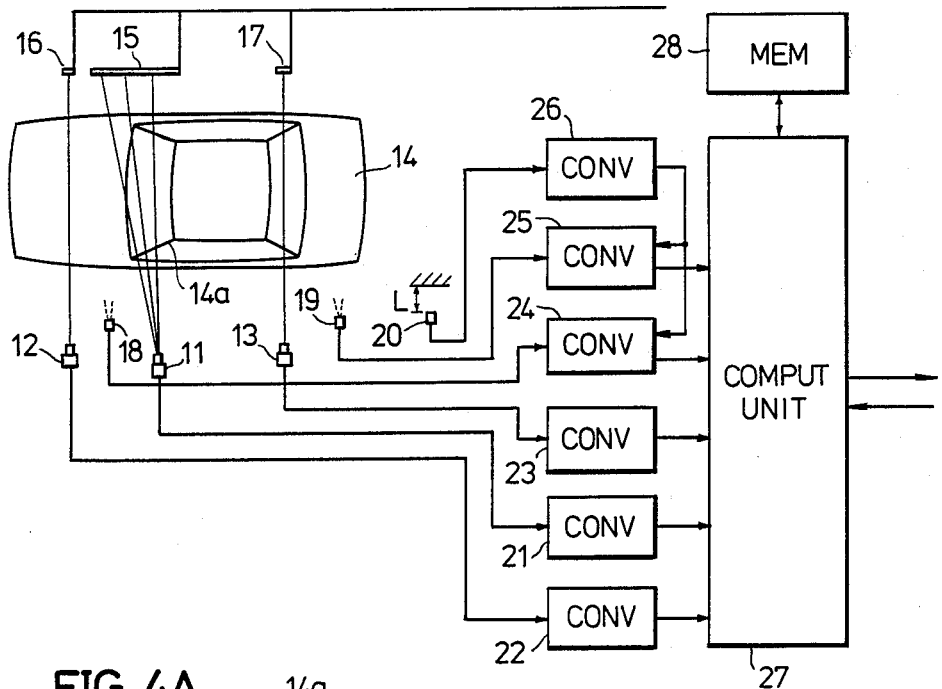
FIG. 1 is a general plan view for explaining a first embodiment of the work position error detecting apparatus according to the present invention.
Figure 2:
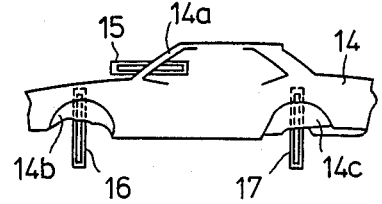
FIGS. 2 and 3 are a side view and a front view respectively for explaining the operation of one dimensional sensors in the first embodiment.
Figure 3:
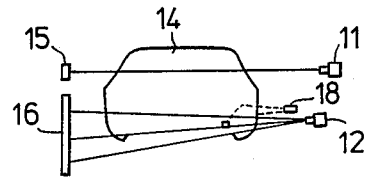

First, a description will be given on a first embodiment of the work position error detecting apparatus according to the present invention by referring to FIGS. 1 through 6. In FIGS. 1 through 3, one dimensional image sensors 11, 12 and 13 are located on a side of a car body 14 which is supplied on a line as a work intermittently. In the present embodiment, the image sensors 11 through 13 are respectively constituted by a photodiode array.

A light source 15 is provided at a position confronting the image sensor 11 with the car body 14 interposed therebetween. In the present embodiment, the light source 15 comprises a high frequency fluorescent lamp. The image sensor 11 detects the light from the light source 15 to detect the position of a front pillar 14a of the car body 14 along an advancing direction on the line (hereinafter referred to as an x-axis direction). A light source 16 is provided at a position confronting the image sensor 12 with the car body 14 interposed therebetween. The image sensor 12 detects the light from the light source 16 to detect the position of a lower end portion of a front wheel house 14b along a height direction (hereinafter referred to as a z-axis direction). Further, a light source 17 is provided at a position confronting the image sensor 13 with the car body 14 interposed therebetween. The image sensor 13 detects the light from the light source 17 to detect the position of a lower end portion of a rear wheel house 14c of the car body 14 along the z-axis direction. The light sources 16 and 17 are constructed similarly to the light source 15.

On the other hand, ultrasonic distance sensors 18 and 19 which are also used as one dimensional sensors are provided at positions separated from each other along the x-axis and confronting the side of the car body 14 for measuring the distance from the car body 14. In addition, an ultrasonic distance sensor 20 is provided at a position not confronting the car body 14. The ultrasonic sensor 20 confronts a fixed reference wall and constantly measures a fixed distance L from the reference wall. Although a measuring error is generated in an output of an ultrasonic sensor due to changes in the ambient temperature, atmospheric pressure and the like, the measuring error in the outputs of the ultrasonic sensors 18 and 19 can be corrected by use of the output of the ultrasonic sensor 20 because the ultrasonic sensor 20 constantly measures the fixed distance L.

The image sensors 11 through 13 are coupled to a computing unit 27 via respective converters 21 through 23, and the ultrasonic sensors 18 through 20 are coupled to the computing unit 27 via respective converters 24 through 26. A memory device 28 is coupled to the computing unit 27.

Next, a description will be given on the operation of the work position error detecting apparatus. First, a description will be given on the detecting principle of the image sensors 11 through 13 by describing the operation of the image sensor 11.

Figure 4A:
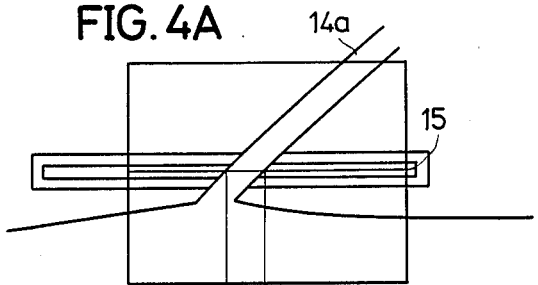
FIG. 4A is a partial side view on an enlarged scale for explaining the operation of a one dimensional sensor in the first embodiment.
Figure 4B:
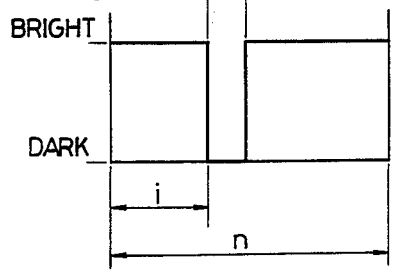
FIG. 4B is a diagram showing an output of the one dimensional sensor shown in FIG. 4A.

When the car body 14 is carried on the line to a predetermined position in a vicinity of a reference position, the light from the light source 15 is blocked by the front pillar 14a as shown in FIG. 4A. As a result, bright and dark portions of the light from the light source 15 are detected by the image sensor 11, and an output shown in FIG. 4B is obtained from the image sensor 11. The image sensor 11 comprises n photodetector elements which are arranged along the x-axis, and it is possible to detect the position of the front pillar 14a by detecting the photodetector elements which are OFF. In FIG. 4B, the (i+1)th photodetector element from the left is OFF, and it is possible to detect the position of the front pillar 14a from this information. The detected position of the front pillar 14a is supplied to the computing unit 27 which recognizes the position of the car body 14 along the x-axis.

The pitch of the photodetectors constituting the image sensor 11 is selected according to the required accuracy with which the position error is to be detected. For example, in the present embodiment, the pitch of the photodetector elements is in the order of 0.01 mm. Charge coupled devices (CCDs) and the like may be used as the photodetector elements.

The image sensors 12 and 13 similarly detect the position of the car body 14 along the z-axis. It is thus possible to detect from the outputs of the image sensors 12 and 13 the rotary position of the car body 14 about a y-axis which is along the width direction of the car body 14.

On the other hand, the converters 24 and 25 obtain times T1 and T2 required to receive ultrasonic waves which are emitted from the respective ultrasonic sensors 18 and 19 and reflected by the side of the car body 14. It is possible to obtain distances L1 and L2 between the car body 14 and the respective ultrasonic sensors 18 and 19 along the y-axis, and also obtain a rotary position of the car body 14 about the z-axis, by processing the time data according to the following equations (1) and (2), where L denotes the distance from the ultrasonic sensor 20 to the fixed reference wall and T denotes the time it takes for the ultrasonic wave transmitted from the ultrasonic sensor 20 to be received after being reflected by the fixed reference wall.

$$L1 = L \times T1/T \tag{1}$$

$$L2 = L \times T2/T \tag{2}$$

Accordingly, five one dimensional distance information are obtained from the sensors 11, 12, 13, 18 and 19. The computing unit 27 calculates the position error of the car body 14 from the reference position based on these five one dimensional distance information and predetermined equations which are pre-stored in the memory device 28. These predetermined equations relate the outputs of the five sensors at the reference position of the car body 14 to the position error (deviation) of the car body 14 from the reference position.

Figure 5A:
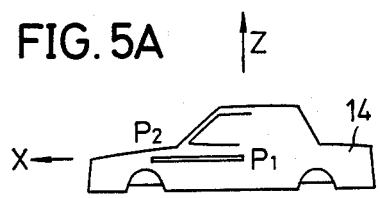
FIGS. 5A and 5B are a side view and a plan view respectively for explaining a coordinate system used for the detection by the one dimensional sensors.
Figure 5B:
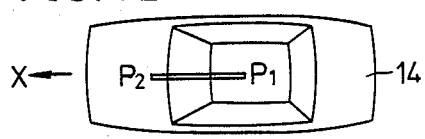
Figure 5C:
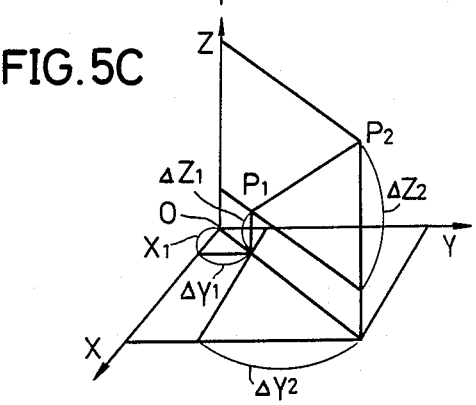
FIG. 5C is a perspective view showing the coordinate system used for the detection by the one dimensional sensors.

Next, a description will be given on the process of calculating the position error of the car body 14 from the five one dimensional distance information described above. As shown in FIGS. 5A and 5B, an imaginary line segment $P_1P_2$ having a length 1 along the x-axis is assumed to be on a center line of the car body 14. It is also assumed that the coordinates of points $P_1$ and $P_2$ of the segment $P_1P_2$ existing in an xyz coordinate shown in FIG. 5C are as follows.

$$P_1 = \begin{pmatrix} x_1 \\ y_1 \\ z_1 \end{pmatrix}, P_2 = \begin{pmatrix} x_2 \\ y_2 \\ z_2 \end{pmatrix}$$

In this case, when the car body 14 is located exactly at the reference position and the position error is zero, the following equations (3) and (4) stand.

$$\begin{pmatrix} x_1 \\ y_1 \\ z_1 \end{pmatrix} = \begin{pmatrix} 0 \\ 0 \\ 0 \end{pmatrix} \tag{3}$$

$$\begin{pmatrix} x_2 \\ y_2 \\ z_2 \end{pmatrix} = \begin{pmatrix} l \\ 0 \\ 0 \end{pmatrix} \tag{4}$$

Hereunder, the outputs of the converters 21 through 25 are respectively denoted by $I_1$, $I_2$, $I_3$, $L_1$ and $L_2$, and deviations of the outputs of the converters 21 through 25 from outputs $I_{10}$, $I_{20}$, $I_{30}$, $L_{10}$ and $L_{20}$ which are obtained from the converters 21 through 25 at the reference position of the car body 14 (that is, zero position error) are respectively denoted by $\Delta I_1$, $\Delta I_2$, $\Delta I_3$, $\Delta L1$ and $\Delta L2$. When the deviation $\Delta I_1$ in the output of the converter 21 when the car body 14 deviates a distance $\Delta x_1$ from the reference position along the x-axis is denoted by $\partial I_1 \partial x_1$, and the deviations of the output of the converter 21 when the car body 14 deviates distances $\Delta y_1$, $\Delta z_1$, $\Delta y_2$ and $\Delta z_2$ are denoted similarly, the deviations of the output of each converter may be described by a matrix $J^{-1}$ in the following equation (5). An inverse matrix $J^{-1}$ of this matrix $J^{-1}$ is obtained, and the elements of the inverse matrix $J^{-1}$ are stored in the memory device 28.

$$J = \begin{pmatrix} \partial I_1/\partial x_1 & \partial I_1/\partial y_1 & \partial I_1/\partial y_2 & \partial I_1/\partial z_1 & \partial I_1/\partial z_2 \\ \partial L_1/\partial x_1 & \partial L_1/\partial y_1 & \partial L_1/\partial y_2 & \partial L_1/\partial z_1 & \partial L_1/\partial z_2 \\ \partial L_2/\partial x_1 & \partial L_2/\partial y_1 & \partial L_2/\partial y_2 & \partial L_2/\partial z_1 & \partial L_2/\partial z_2 \\ \partial I_2/\partial x_1 & \partial I_2/\partial y_1 & \partial I_2/\partial y_2 & \partial I_2/\partial z_1 & \partial I_2/\partial z_2 \\ \partial I_3/\partial x_1 & \partial I_3/\partial y_1 & \partial I_3/\partial y_2 & \partial I_3/\partial z_1 & \partial I_3/\partial z_2 \end{pmatrix} \tag{5}$$

Figure 6:
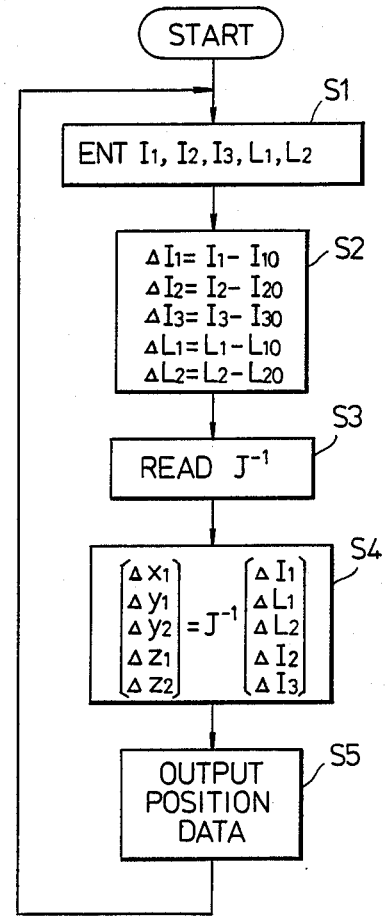
FIG. 6 is a flow chart for explaining the operation of a computing unit in the first embodiment.

FIG. 6 is a flow chart showing the operation of a microcomputer (not shown) when the microcomputer is used to carry out the operation of the computing unit 27 for calculating the position error of the car body 14. The position error (deviation) ($\Delta x_1$, $\Delta y_1$, $\Delta y_2$, $\Delta z_1$, $\Delta z_2$) is calculated in the following sequence. A step S1 enters output data ($I_1$, $I_2$, $I_3$, L1, L2) of the converters 21 through 25, and a step S2 subtracts the output data $I_{20}$, $I_{30}$, $L_{10}$, L of the converters 21 through 25 at the reference position of the car body 14 from the output data ($I_1$, $I_2$, $I_3$, L1, L2) to obtain the deviation ($\Delta I_1$, $\Delta I_2$, $\Delta I_3$, $\Delta L1$, $\Delta L2$). A step S3 reads out the elements of the inverse matrix $J^{-1}$ from the memory device 28, and a step S4 carries out the following operation of equation (6).

$$\begin{pmatrix} \Delta x_1 \\ \Delta y_1 \\ \Delta y_2 \\ \Delta z_1 \\ \Delta z_2 \end{pmatrix} = J^{-1} \begin{pmatrix} \Delta I_1 \\ \Delta L_1 \\ \Delta L_2 \\ \Delta I_2 \\ \Delta I_3 \end{pmatrix} \tag{6}$$

A step S5 supplies to a robot control part (not shown) of the robot system the position data along the directions of the x, y and z axes and rotary position data about the y and z axes. By carrying out such calculation, it is possible to detect the deviation of the car body 14 from the reference position in various directions excluding the rotary deviation about the x-axis.

In the first embodiment described heretofore, the sensors 11 through 13 and 18 through 20 are provided on the side of the car body 14. For this reason, compared to the conventional apparatus which uses the television cameras located below the car body 14, it is possible to minimize the detecting error caused by dirt, damage and the like on the sensor part.

Figure 7:
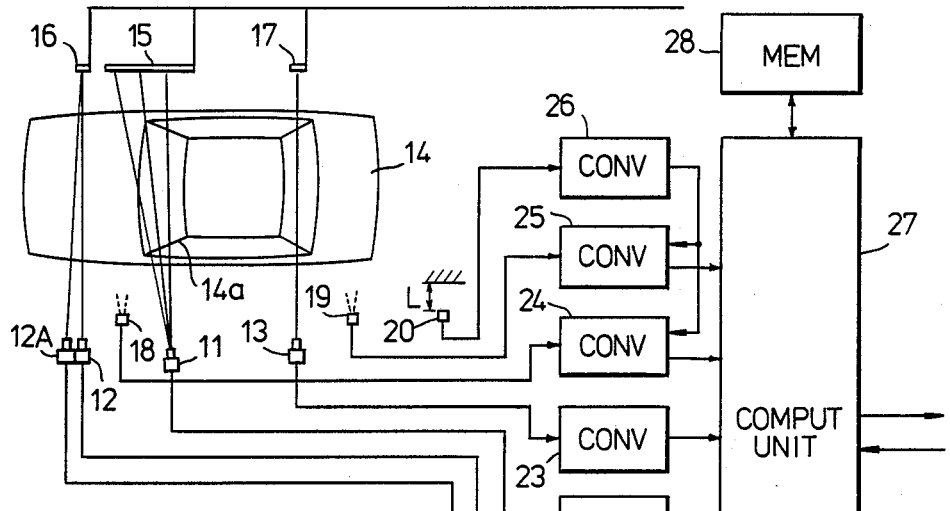
FIG. 7 is a general plan view for explaining a second embodiment of the work position error detecting apparatus according to the present invention.
Figure 8:
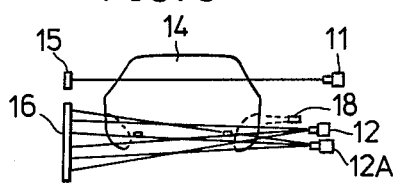
FIG. 8 is a front view for explaining the operation of one dimensional sensors in the second embodiment.

Next, a description will be given on a second embodiment of the work position error detecting apparatus according to the present invention, by referring to FIGS. 7 and 8. In FIGS. 7 and 8, those parts which are the same as those corresponding parts in FIGS. 1 and 3 are designated by the same reference numerals, and a description thereof will be omitted.

In the second embodiment, in addition to the image sensor 12 for detecting the height at the front wheel house 14b on one side of the car body 14, an image sensor 12A is provided for detecting the height at the front wheel house 14b on the other side of the car body 14. An output of this image sensor 12A is supplied to the computing unit 27 via a converter 22A.

By the provision of the image sensor 22A, it is possible to obtain the rotary position data of the car body 14 about the x-axis, in addition to the position data obtainable in the first embodiment. As a result, it is possible to obtain all of the position data of the car body 14, that is, the position data along the x, y and z axes and the rotary position data about the x, y and z axes. Therefore, it is possible to detect the position error of the car body 14 from the reference position with an even higher accuracy compared to the first embodiment.

Figure 9:
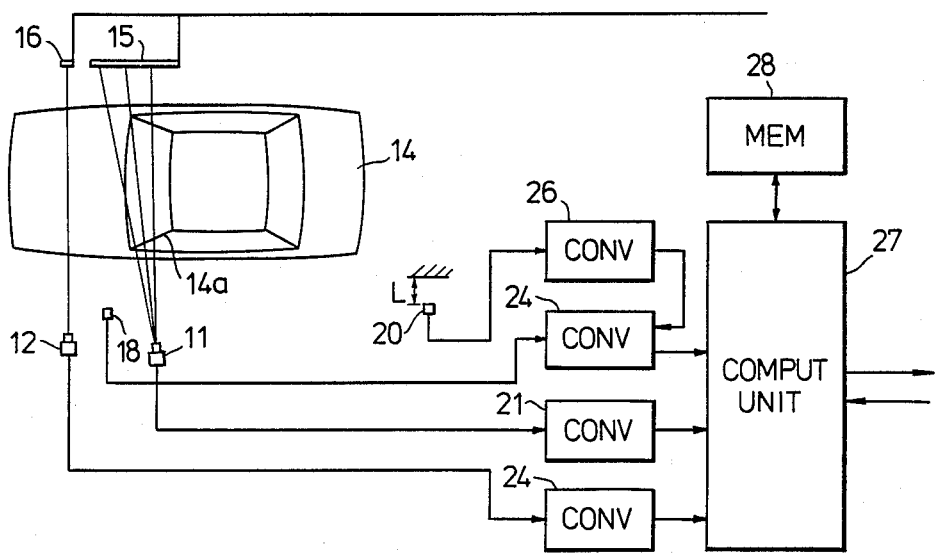
FIG. 9 is a general plan view for explaining a third embodiment of the work position error detecting apparatus according to the present invention.
Figure 10:
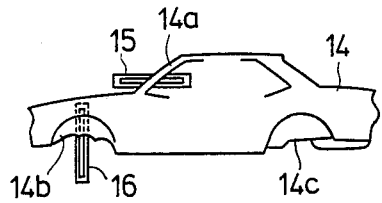
FIGS. 10 and 11 are a side view and a front view respectively for explaining the operation of one dimensional sensors in the third embodiment.
Figure 11:
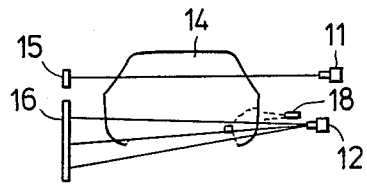
Figure 12:
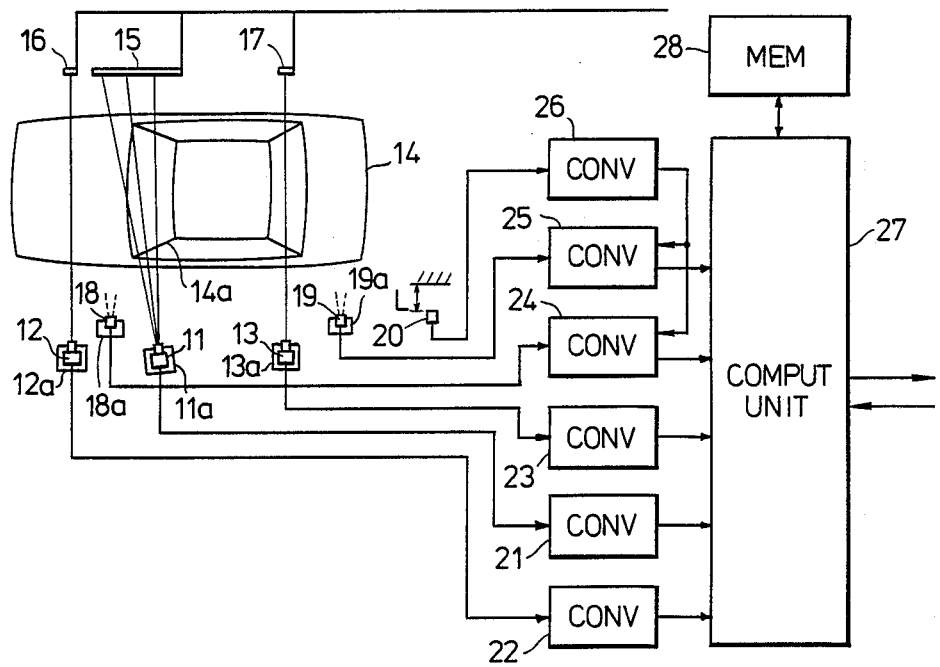
FIG. 12 is a general plan view for explaining a fourth embodiment of the work position error detecting apparatus according to the present invention.
Figure 13:
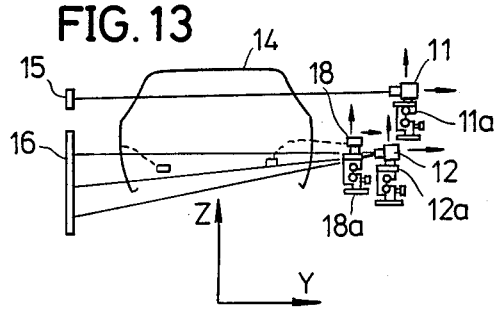
FIG. 13 is a front view for explaining the operation of one dimensional sensors in the fourth embodiment.

Next, a description will be given on a third embodiment of the work position error detecting apparatus according to the present invention, by referring to FIGS. 9 through 11. In FIGS. 9 through 11, those parts which are the same as those corresponding parts in FIGS. 1 through 3 are designated by the same reference numerals, and a description thereof will be omitted.

In the third embodiment, only three sensors are used for the actual detection of the position error. The image sensor 11 detects the position of the car body 14 along the x-axis at the front pillar 14, the image sensor 12 detects the position of the car body 14 along the z-axis at the front wheel house 14b, and the ultrasonic sensor 18 detects the position of the car body 14 along the y-axis. The ultrasonic sensor 20 is used for correcting the output of the ultrasonic sensor 18 depending on the environment. Accordingly, it is possible to detect the position error caused by parallel movement of the car body 14 along the x, y and z axes, that is, all of the position error excluding rotary deviation about the x, y and z axes.

Hence, when the rotary deviation of the work (car body 14) can be neglected and is not a problem, it is possible to obtain a sufficiently accurate position error according to the third embodiment.

The number of one dimensional sensors is of course not limited to those of the embodiments described heretofore. The number of one dimensional sensors may be appropriately selected depending on the size of work, the manner in which the work is supported on the line and the like.

According to the first through third embodiments, it is possible to obtain the following advantageous effects because at least three one dimensional sensors having mutually different detecting (measuring) directions are used and the position error of the work from the reference position is calculated based on the outputs of the one dimensional sensors.

Firstly, it is possible to improve the resolution and detecting accuracy compared to the conventional apparatus which uses the television cameras, because the position of the work is detected by processing data from one dimensional sensors.

Secondly, it is unnecessary to carry out the image processing required in the conventional apparatus which uses the television cameras, since it is sufficient to process the position data from each one dimensional sensor in the one dimensional coordinate. For this reason, it is possible to reduce the quantity of data which must be subjected to the computing process, and thus, the response of the work position error detecting apparatus is quick.

Thirdly, it is possible to adjust the detecting accuracy with ease by increasing or decreasing the number of one dimensional sensors according to the needs.

Fourthly, the reliability and durability of the work position error detecting apparatus can be improved because each one dimensional sensor can detect the deviation of the work in the respective direction without making contact with the work.

Fifthly, the one dimensional sensors do not interfere with the incoming work on the line when the one dimensional sensors are provided on the side of the work.

In the first through third embodiments, an adjusting operation must be carried out beforehand to determine the correlation between the absolute value of the deviation of the work and the corresponding change in the outputs of the one dimensional sensors. In order to carry out this adjusting operation, the work must be moved predetermined distances in the respective detecting directions (for example, the directions along the x, y and x axes) of the one dimensional sensors so as to detect the changes in the outputs of the one dimensional sensors and obtain the correlation between the change and the predetermined distances which are known.

The work is moved by a work moving mechanism which is provided independently of the line where the robot system is to be used, and the work moving mechanism moves the work the predetermined distances in the respective detecting direction of the one dimensional sensors. Hence, it is essential to use the work moving mechanism when carrying out the adjusting operation, and the following problems occur.

In other words, when the work is a large object such as a car body, an extremely large and powerful work moving mechanism is required.

In addition, since the adjusting operation is carried out by use of the work moving mechanism at a location different from the actual location where the robot system will be used, an error is easily generated in the detected position of the work when the robot system is set to the actual location.

Furthermore, the correlation described above may change due to aged deterioration of the one dimensional sensors, and in this case, an error is generated in the detected position of the work.

A fourth embodiment of the work position error detecting apparatus according to the present invention eliminates the problems described above by making the one dimensional sensors movable in the respective detecting directions. A description will now be given on the fourth embodiment by referring to FIGS. 12 through 16. In FIGS. 12 through 16, those parts which are the same as those corresponding parts in FIGS. 1 and 3 are designated by the same reference numerals, and a description thereof will be omitted. In the present embodiment, the image sensors 11 through 13 are mounted on corresponding xyz tables 11a through 13a and are movable in the directions along the x, y and x axes. In addition, the ultrasonic sensors 18 and 19 are similarly mounted on corresponding xyz tables 18a and 19a and are movable in the directions along the x, y and x axes.

First, a description will be given on the construction of the xyz tables 11a through 13a, 18a and 19a. In the present embodiment, all of the xyz tables have the same construction, and for this reason, a description will only be given on an embodiment of the xyz table 11a which supports the image sensor 11, by referring to FIGS. 14A and 14B.

Figure 14A:
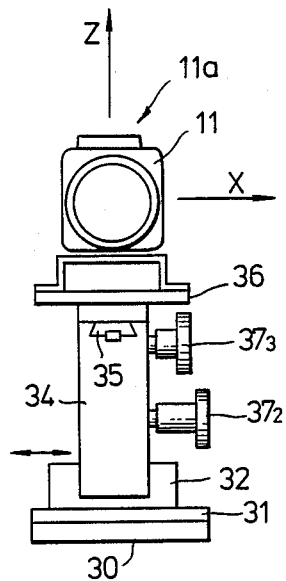
FIGS. 14A and 14B are a front view and a side view respectively showing an embodiment of a sensor moving table in the fourth embodiment.
Figure 14B:
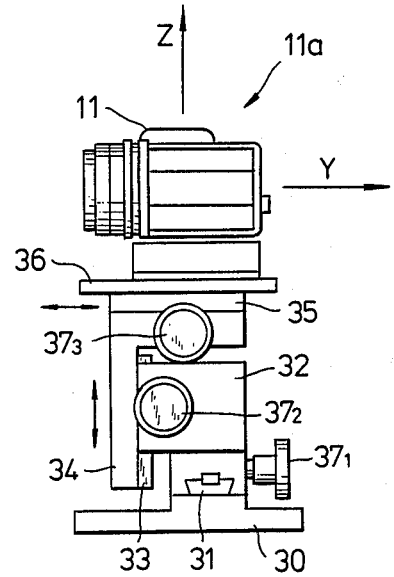

In FIGS. 14A and 14B, a dovetail guide 31 extends along the x-axis on a pedestal 30, and an x-table 32 is slidably supported on the dovetail guide 31 and is movable along the x-axis. A dovetail guide 33 extends along the z-axis on the x-table 32, and a z-table 34 is slidably supported on the dovetail guide 33 and is movable along the z-axis. In addition, a dovetail guide 35 extends along the y-axis on the z-table 34, and a y-table 36 is slidably supported on the dovetail guide 35 and is movable along the y-axis. The image sensor 11 is mounted on the y-table 36. Handle wheels $37_1$, $37_2$ and $37_3$ are provided on the respective tables 32, 34 and 36. When the handle wheels $37_1$, $37_2$ and $37_3$ are manipulated so as to operate the corresponding rack and pinion mechanisms (not shown), the tables 32, 34 and 36 move in the respective directions along the x, z and y axes.

Figure 15A:
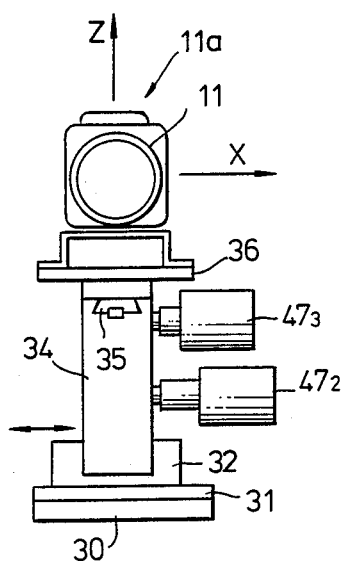
FIGS. 15A and 15B are a front view and a side view respectively showing another embodiment of a sensor moving table in the fourth embodiment.
Figure 15B:
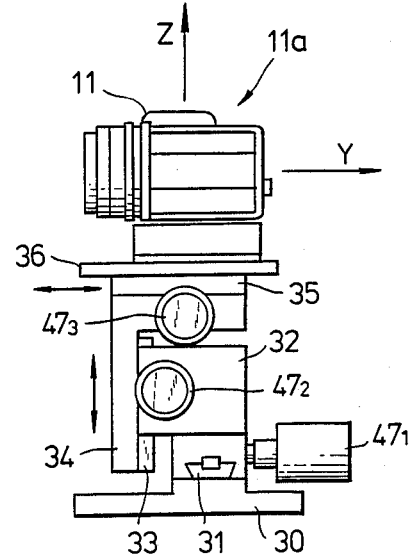

FIGS. 15A and 15B show another embodiment of the xyz table 11a. In FIGS. 15A and 15B, those parts which are the same as those corresponding parts in FIGS. 14A and 14B are designated by the same reference numerals, and a description thereof will be omitted. In the present embodiment, step motors $47_1$ through $47_3$ are used instead of the handle wheels $37_1$ through $37_3$, so that the tables 32, 34 and 36 may be moved automatically in the respective directions instead of the manual drive using the handle wheels $37_1$ through $37_3$.

Next, a description will be given on the method of converting the distance information obtained from the one dimensional sensors into the absolute value of the position error. First, the car body 14 is fixed at a predetermined position on the line. When the handle wheel $37_1$ (or step motor $47_1$) of the xyz table 11a is operated so as to move the image sensor 11 a predetermined distance $\Delta x$ along the x-axis, the distance information $I_1$ obtained from the output of the image sensor 11 (that is, the output of the converter 21) changes by $\Delta I_1$. Similarly, when handle wheel $37_2$ (or step motor $47_2$) of the xyz table $11a$ is operated so as to move the image sensor 11 a predetermined distance $\Delta z$ along the z-axis, the distance information $I_1$ obtained from the output of the image sensor 11 (that is, the output of the converter 21) changes by $\Delta I_1$. Furthermore, when handle wheel $37_3$ (or step motor $47_3$) of the xyz table $11a$ is operated so as to move the image sensor 11 a predetermined distance $\Delta y$ along the y-axis, the distance information $I_1$ obtained from the output of the image sensor 11 (that is, the output of the converter 21) changes by $\Delta I_1$. Accordingly, the following correlation data can be obtained from the changes in the distance information along the x, y and z axes.

$(\Delta I_1/\Delta x_1, \Delta I_1/\Delta y_1, \Delta I_1/\Delta z_1)$

Similarly, changes $\Delta I_2$, $\Delta I_3$, $\Delta L_1$ and $\Delta L_2$, in distacce information $I_2$, $I_3$, $L_1$ and $L_2$ obtained from the sensors 12, 13, 18 and 19 can be obtained by moving the corresponding xyz tables $12a$, $13a$, $18a$ and $19a$ the respective predetermined distances $\Delta x$, $\Delta y$ and $\Delta z$ along the x, y add z axes. Hence, the following correlation data can be obtained between the distance information obtained from the sensor outputs and the absolute values of the deviation (position change) of the car body 14.

$(\Delta I_2/\Delta x_2, \Delta I_2/\Delta y_2, \Delta I_2/\Delta z_2)$ $(\Delta I_3/\Delta x_3, \Delta I_3/\Delta y_3, \Delta I_3/\Delta z_3)$ $(\Delta L_1/\Delta x_4, \Delta L_1/\Delta y_4, \Delta L_1/\Delta z_4)$ $(\Delta L_2/\Delta x_5, \Delta L_2/\Delta y_5, \Delta L_2/\Delta z_5)$ The fifteen correlation data obtained in this manner are dependent on the kind of the car body 14, that is, the model of the car body 14. Hence, the fifteen correlation data and the distance information $I_{10}$, $I_{29}$, $I_{30}$, $L_{10}$ and $L_{20}$ obtained from the outputs of the sensors 11 through 13, 18 and 19 at the reference position of the car body 14 are stored in the memory device 28 for each model.

When actually detecting the position error of the car body 14 from the reference position, the information stored in the memory device 28 is read out and the absolute value of the deviation is calculated in the computing unit 27 from the outputs of each sensor (obtained via the converter) based on the read out correlation data. Hence, it is possible to detect the deviation of the car body 14 from the reference position along the x, y and z axes and also the rotary deviation of the car body 14 from the reference position about the y and z axes. It is thus possible to supply a correction signal to the robot control part (not shown) of the robot system dependent on the deviation (position error) of the car body 14 from the reference position.

The correlation data may be obtained automatically by controlling the step motors $47_1$ through $47_3$ by an output of the computing unit 27.

According to the fourth embodiment, the following advantageous effects are obtainable in addition to the effects obtainable in the first through thrrd embodiments, because the one dimensional sensors are movable in the respective detecting directions.

Firstly, it is unnecessary to provide a large and powerful work moving mechanism when obtaining the correlation data, since the xyz tables are used to move the sensors so as to relatively move the work with respect to the sensors.

Secondly, it is possible to obtain the correlation data with the work positioned at the actual location where tee robot system is to operate, and no error is generated in the detected position of the work.

Thirdly, the correlation data described above may change due to aged deterioration of the one dimensional sensors, but in this case, the correlation data may be corrected with ease.

Figure 16A:
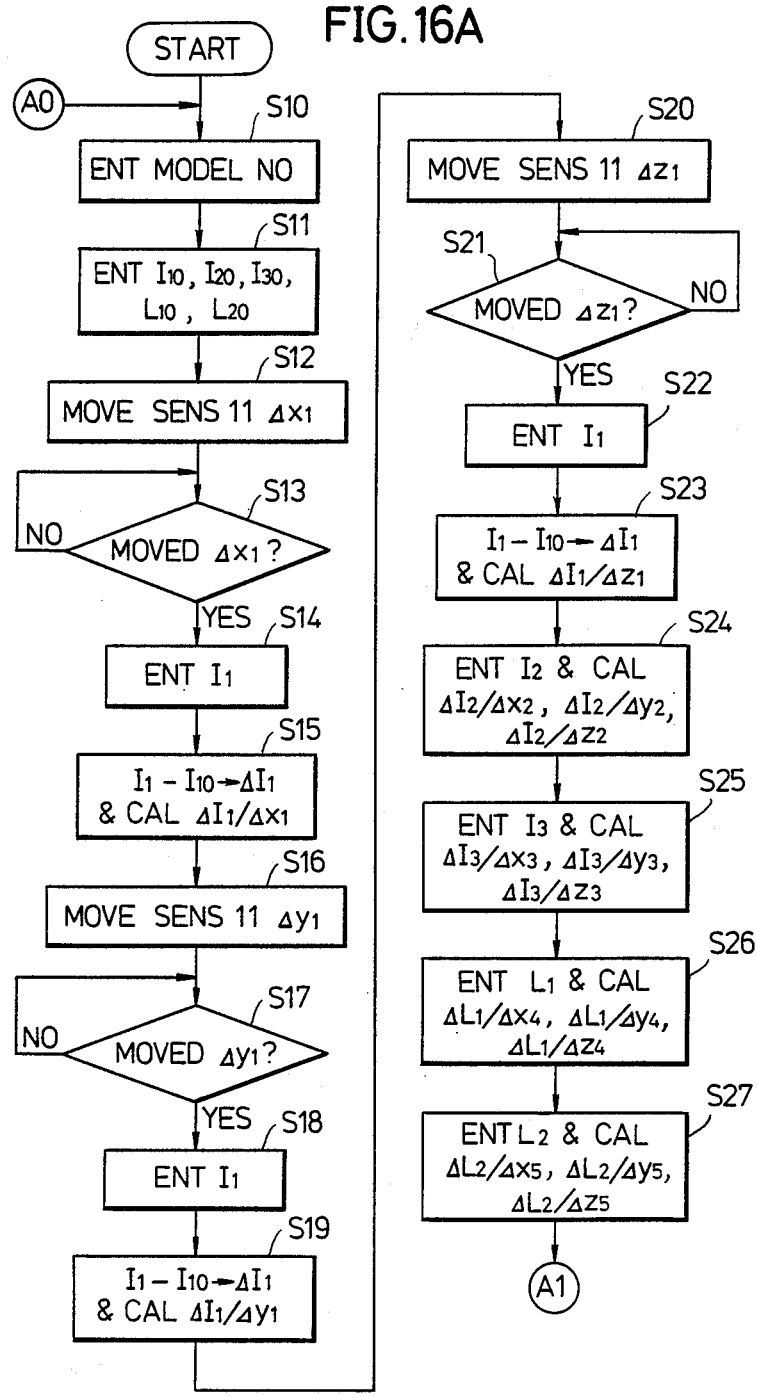

In the case where the work is a car body, the car bodies on the line may not necessarily be the car bodies of the same model. Accordingly, when the car bodies of a plurality of different models exist on the line, it is necessary to store in the memory device 28 the correlation data and the distance information obtained from the outputs of each of the sensors at the reference position of the car body for each of the models. FIGS. 16A and 16B are flow charts for explaining an embodiment of the operation of a microcomputer (not shown) when the operation of the computing unit 27 is carried out by the microcomputer.

In FIG. 16A, a step S10 enters the model number of the car body 14 from the robot control part of the robot system, and a step S11 enters the position information $I_{10}$, $I_{20}$, $I_{30}$, $L_{10}$ and $L_{20}$ obtained from the sensors 11, 12, 13, 18 and 19 at the reference position of the car body 14. A step S12 moves the image sensor 11 the distance $\Delta x_1$ along the x-axis. The image sensor 11 may be moved by driving the step motor $47_1$ or by displaying an instruction on a display device (not shown) for the operator to manually operate the handle wheel $37_1$. A step S13 discriminates whether or not the image sensor 11 has moved the distance $\Delta x_1$, and a step S14 enters the position information $I_1$ obtained from the output of the image sensor 11 when the discrimination result in the step S13 becomes YES. A step S15 calculates $\Delta I_1$ from $I_1$-$I_{10}$ and calculates $\Delta I_1/\Delta xl$.

A step S16 moves the image sensor 11 the distance $\Delta yl$ along the y-axis similarly as in the case of the step S12. A step S17 discriminates whether or not the image sensor 11 has moved the distance $\Delta yl$, and a step S18 enters the positinn information $I_1$ obtained from the output of the image sensor 11 when the discrimination result in the step S17 becomes YES. A step S19 calculates $I_1$ from $I_1$-$I_{10}$ and calculates $\Delta I_1/\Delta yl$ A step S20 moees the image sensor 11 the distance $\Delta z_1$ along the z-axis similarly as in the case of the step S12. A seep S21 discriminates whether or not the image sensor 11 has moved the distance $\Delta z_1$, and a step S22 enters the position information $I_1$ obtained from the output of the image sensor 11 when the discrimination result in the step S21 becomes YES. A step S23 calculates $\Delta I_1$ from $I_1$-$I_{10}$ and calculates $\Delta I_1/\Delta z_1$ Next, a step S24 carries out a routine corresponding to the steps S12 through S23 described above with respect to the distance information $I_2$ obtained from the output of the image sensor 12, and calculates $\Delta I_2/\Delta x_2$, $\Delta I_2/\Delta y_2$ and $\Delta I_2/\Delta z_2$. Similarly, steps S25, S26 and S27 carry out routines corresponding to the steps S12 through S23 described above with respect to the distance information $I_3$, $L_1$ and $L_2$ obtained from the outputs of the sensors 13, 18 and 19, and respectively calculate $(\Delta I_3/\Delta x_3, \Delta I_3/\Delta y_3$ and $\Delta I_3/\Delta z_3)$, $(\Delta L_1/\Delta x_4, \Delta L_1/\Delta y_4$ and $\Delta L_1/\Delta z_4$ and $(\Delta L_2/\Delta x_5, \Delta L_2/\Delta y_5$ and $\Delta L_2/\Delta z_5)$.

In FIG. 16B, a step S28 stores the model number, the distance information $I_{10}$, $I_{20}$, $I_{30}$, $L_{10}$ and $L_{20}$, $(\Delta I_1/\Delta x_1, \Delta I_1/\Delta y_1$ and $\Delta I_1/\Delta z_1)$, $(\Delta I_2/\Delta x_2, \Delta I$ and $\Delta I_2/\Delta z_2)$, $(\Delta I_3/\Delta x_3, \Delta I_3/\Delta y_3$ and $\Delta I_3/\Delta z_3)$, $(\Delta L_1/\Delta x_4, \Delta L_1/\Delta y_4$ and $\Delta L_1/\Delta z_4)$ and $(\Delta L_2/\Delta x_5, \Delta L_2/\Delta y_5$ and $\Delta L_2/\not\neq$the memory device 28. A step S29 discriminates whether or not it is necessary to obtain the correlation data for other models, and the operation returns to the step S10 shown in FIG. 16A when the discrimination result in the step S29 is YES. On the other hand, when the discrimination result in the step S29 is NO, a step S30 discriminaes whether or not there is a request for the data on the work position error from the robot control part. When the discrimination result in the step S30 becomes YES, a step S31 enters the model number from the robot control part. A step S32 reads out from the memory device 28 the correlation data and the distance information obtained from the outputs of each of the sensors at the reference position of the car body 14 for the model number entered in the step S31.

A step S33 enters the distance information $I_1$, $I_2$, $I_3$, $L_1$ and $L_2$ obtained from the outputs of each of the sensors. A step S34 calculates $\Delta I_1$, $\Delta I_2$, $\Delta I_3$, $\Delta L_1$ and $\Delta L_2$ from $I_1-I_{10}$, $I_2-I_{20}$, $I_3-I_{30}$, $L_1-L_{10}$ and $L_2-L_{20}$, respectively. A step S35 calculates the deviation of the car body 14 along the x, y and z axes and the rotary deviation of the car body 14 about the y and z axes from the reference position, based on $\Delta I_1$ through $\Delta L_2$ calculated in the step S34 and the correlation data read out in the step S32. A step S36 supplies to the robot control part the position error information on the car body 14 calculated in the step S35. Accordingly, the robot control part can supply a correction signal to the robot (not shown) according to the position error information, so as to correct the position of the car body 14 to the reference position.

In each of the embodiments described heretofore, it is possible to use instead of the ultrasonic sensors a type of sensor which irradiates a laser beam on the car body 14 and detects the distance from the car body 14 by detecting an incident angle of the reflected laser beam.

Further, the present invention is not limited to these embodiments, but various variations and modifications may be made without departing from the scope of the present invention.

What is claimed is:

1. A work position error detecting apparatus comprising:
    three one dimensional sensors for each detecting a position of a corresponding portion of a work along a corresponding direction and for generating outputs dependent on the detected positions of the portions of said work, said three one dimensional sensors being arranged so that the directions are mutually different among said three one dimensional sensors;
    memory means for prestoring reference position data based on outputs of said three one dimensional sensors obtained from said work in a reference position; and
    computing means coupled to said three one dimensional sensors and to said memory means for calculating and outputting a position error quantity of said work from outputs of said three one dimensional sensors and said reference position data prestored in said memory means.

2. A work position error detecting apparatus as claimed in claim 1 in which said one dimensional sensors are provided on a side of said work.

3. A work position error detecting apparatus as claimed in claim 1 in which said three one dimensional sensors comprise a first one dimensional sensor for detecting a position of a first portion of said work along a direction of a length of said work, a second one dimensional sensor for detecting a position of a second portion of said work along a direction of a height of said work, and a third one dimensional sensor for detecting a position of a third portion of said work along a direction of a width of said work.

4. A work position error detecting apparatus as claimed in claim 3 in which said third one dimensional sensor is constituted by an ultrasonic distance sensor for detecting the position of the third portion of said work by measuring a distance between the third portion and the third one dimensional sensor.

5. A work position error detecting apparatus as claimed in claim 3 which further comprises a fourth one dimensional sensor for detecting a position of a fourth portion of said work along the direction of the height thereof, said second and fourth portions being separated from each other along the direction of the length of said work.

6. A work position error detecting apparatus as claimed in claim 3 which further comprises a fourth one dimensional sensor for detecting a position of a fourth portion of said work along the direction of the width thereof, said second and fourth portions being separated from each other along the direction of the length of said work.

7. A work position error detecting apparatus as claimed in claim 3 in which each of said first and second one dimensional sensors is constituted by an optical sensor for detecting the position of a corresponding portion of said work by receiving a light from a corresponding light source via said work.

8. A work position error detecting apparatus as claimed in claim 7 in which said optical sensor comprises an array of light receiving elements which are arranged with a constant pitch along a direction in which the position of the portion of said work is detected.

9. A work position error detecting apparatus as claimed in claim 1 in which each one dimensional sensor is movable along the direction in which the position of a corresponding portion of said work is detected by said each one dimensional sensor.

10. A work position error detecting apparatus as claimed in claim 9 in which each one dimensional sensor is provided on a table which is movable along the directions of length, height and width of said work.

11. A work position error detecting apparatus as claimed in claim 9 in which said computing means comprises correlation data calculating means for calculating correlation data between deviations of said one dimensional sensors and changes in outputs of said sensors caused by the deviations and for supplying the correlation data into said memory means, said position error quantity being calculated by also using said correlation data.

12. A work position error detecting apparatus as claimed in claim 11 in which said correlation data calculating means calculates correlation data for a plurality of different kinds of work.

13. A work position error detecting apparatus as claimed in claim 1 in which said work is a car body.

14. A work position error detecting apparatus as claimed in claim 13 in which one of said one dimensional sensors detects a position of a pillar portion of the car body along a direction of a length thereof.

15. A work position error detecting apparatus as claimed in claim 13 in which one of said one dimensional sensors detects a position of a wheel house portion of the car body along a direction of a height thereof.

* * * * *